No. 837,388. PATENTED DEC. 4, 1906.
E. L. CURIAL.
KITCHEN UTENSIL.
APPLICATION FILED FEB. 13, 1905.
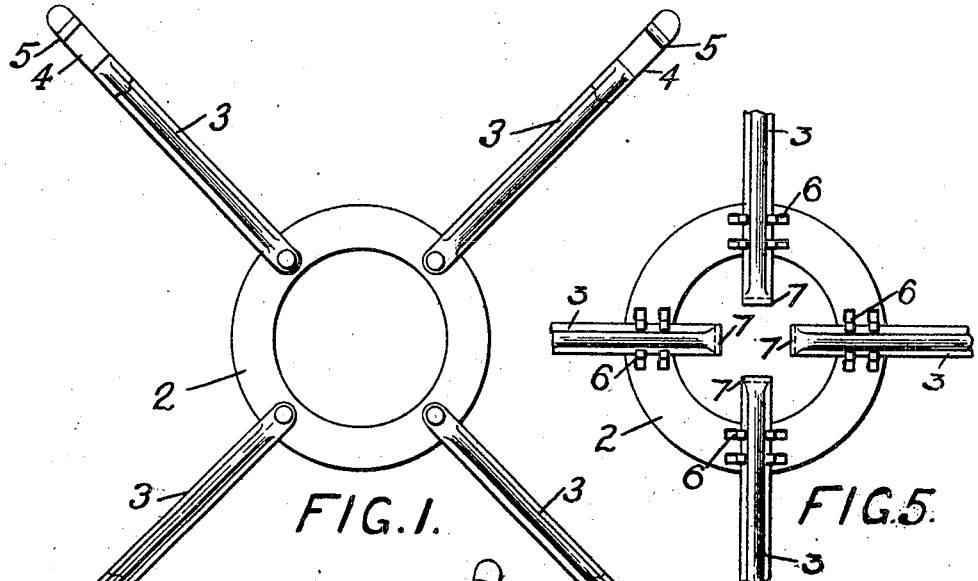
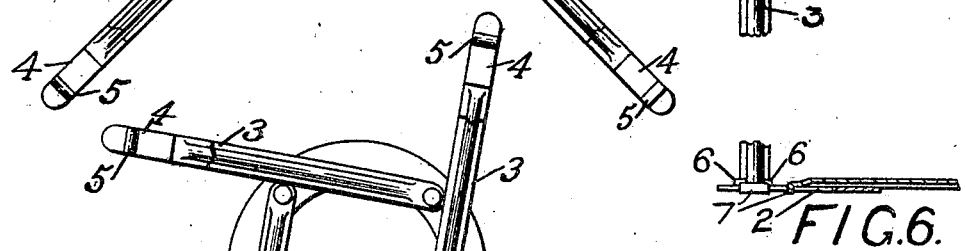
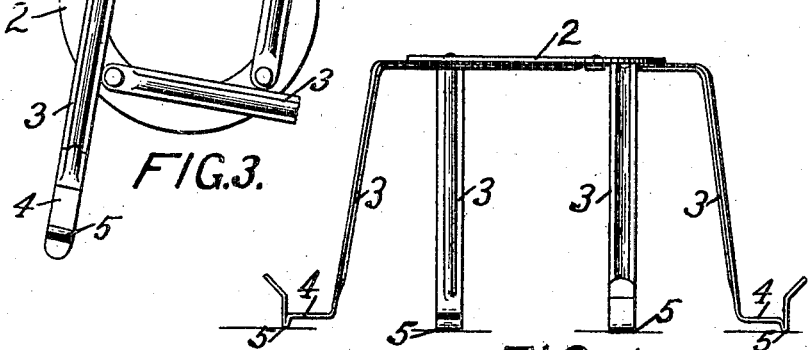
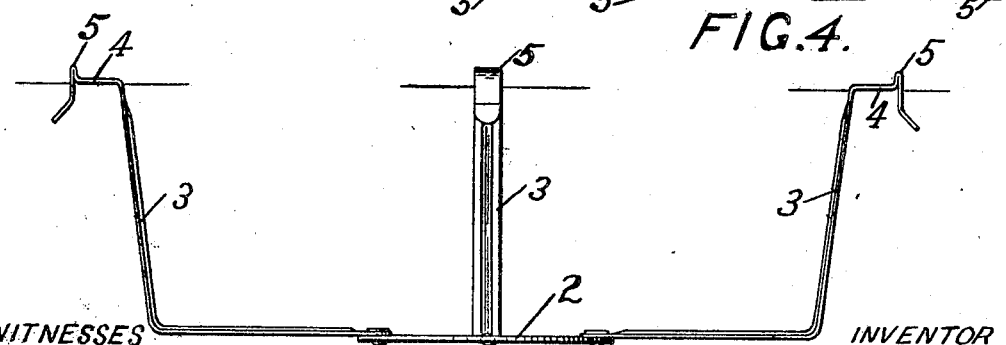
WITNESSES
F. O. Tanner
C. MacNamara
INVENTOR
EDWARD L. CURIAL
BY Paul & Paul
HIS ATTORNEYS.

UNITED STATES PATENT OFFICE.

EDWARD L. CURIAL, OF ANOKA, MINNESOTA.

KITCHEN UTENSIL.

No. 837,388.　　　　　Specification of Letters Patent.　　　　Patented Dec. 4, 1906.

Application filed February 13, 1905. Serial No. 245,393.

*To all whom it may concern:*

Be it known that I, EDWARD L. CURIAL, of Anoka, Anoka county, Minnesota, have invented certain new and useful Improvements in Kitchen Utensils, of which the following is a specification.

The object of my invention is to provide means for suspending a dish or pan containing an article of food within a kettle for steaming purposes or for the purpose of keeping a cooked food hot.

The invention consists generally in a series of arms having means for engaging the top of a kettle and depending within the kettle to support a dish or other food-receptacle therein.

Further, the invention consists in providing a series of arms having a connecting means at their inner end, which allows them to be moved toward or from each other to fit them for use in kettles of different size.

Further, the invention consists in various constructions and combinations, all as hereinafter described, and particularly pointed out in the claims.

In the accompanying drawings, forming part of this specification, Figure 1 is a plan view of a kitchen utensil embodying my invention. Fig. 2 is a side view of the same. Fig. 3 is a plan view showing the arms folded or adjusted to fit within a small-sized kettle. Fig. 4 is a side view of the device in an inverted position to be placed over an alcohol or gas flame. Fig. 5 is a plan view illustrating a modified means of securing the arms to the central connecting-ring. Fig. 6 is a horizontal sectional view taken lengthwise of one of the sliding arms of Fig. 5 and across the supporting-ring.

In the drawings, 2 represents a ring of suitable size, to which a series of arms 3 are pivoted at suitable intervals. Each arm has a horizontal portion that lies in substantially the same horizontal plane with the ring 2 and forms the rest or support for the dish or other receptacle that is suspended within the kettle, the ring 2 merely serving as a connecting means for the inner ends of the arms. The arms 3 have a substantially vertical portion that terminates in outwardly-turned ends 4, that engage the top of the kettle and support the device therein. A loop 5 is preferably formed in each end 4 to act as a guard for the kettle-cover, the edge of the cover fitting in between the guards of all the arms and resting upon the ends 4.

The arms are preferably provided with longitudinal ribs which serve to brace and strengthen them, and each arm can be swung on its pivot toward the other arms until the opposite arms are substantially parallel with one another, as shown in Fig. 3, and then the device can be easily inserted into a kettle of small size, and if it should be desired to suspend the utensil within a tea-kettle for the purpose of melting chocolate or steaming some article of food the arms can be first swung to the position shown in Fig. 3 and then further contracted by lifting each arm up over the pivot of the contiguous arm and sliding it on that arm until the vertical portions of the arms are nearly within the vertical plane of the connecting-ring. The device can then be easily dropped into the open top of a tea-kettle.

In Figs. 5 and 6 I have shown a modification in the manner of connecting the arms to the central ring, which consists in providing lugs 6, arranged in pairs on said ring and preferably pressed out of the ring itself and between which lugs the horizontal portions of the arms are adapted to slide, the inner ends 7 of said arms being downwardly turned to prevent them from being pulled entirely away from the ring. This device is adjustable, but cannot be contracted into so small a compass as the construction shown in the previous figures. These supporting devices may be made of any suitable material, preferably flat band metal, and may be made of any suitable size, and while the connecting means between the inner ends of the arms is shown with a central hole a solid disk may be employed, if preferred. The ring, however, renders the device peculiarly adapted for heating or steaming articles of food in cups or small dishes and also effects considerable economy in the amount of metal used.

I claim as my invention—

1. As a new article of manufacture, a kitchen utensil comprising a series of arms having means at their outer ends to engage the top of a kettle and a connecting means at their inner ends whereon said arms are mounted at intervals, and the intermediate portion of said arms being adapted to form a rest or support for a dish or other receptacle within the kettle, substantially as described.

2. As a new article of manufacture, a kitchen utensil comprising a series of arms having means at one end to engage the top of a kettle and means connecting the opposite ends of said arms, said arms having independent connections at intervals on said connecting means and being movable with respect to said connecting means to adapt the device for use on kettles of different sizes.

3. As a new article of manufacture, a kitchen utensil comprising a series of arms having a connecting means at their inner ends whereon said arms are mounted at intervals and said arms being provided with horizontal portions near said connecting means whereon the dish or other receptacle is placed, and the outer portions of said arms being substantially vertical and terminating in a kettle-engaging means, substantially as described.

4. As a new article of manufacture, a kitchen utensil comprising a series of arms, a ring connecting them at their inner ends and whereon said arms are movable, the outer ends of said arms having means engaging the top of the kettle.

5. A kitchen utensil comprising a series of arms having means to engage the top of a kettle, and a connecting means at their inner ends whereon said arms are eccentrically mounted and movable toward or from each other to adapt the device for kettles of different sizes, substantially as described.

6. A kitchen utensil comprising a series of arms and a connecting means at their inner ends, the outer ends of said arms having means engaging the top of the kettle, and a cover-retaining means.

7. A kitchen utensil comprising a series of arms having means to engage the top of a kettle, and a connecting means whereon said arms are eccentrically pivoted at intervals.

In witness whereof I have hereunto set my hand this 2d day of February, 1905.

EDWARD L. CURIAL.

Witnesses:
C. G. HANSON,
C. MACNAMARA.